United States Patent
Stojanovic et al.

(10) Patent No.: US 11,101,891 B2
(45) Date of Patent: Aug. 24, 2021

(54) AUXILIARY CHANNEL IN PAM/QAM SYSTEMS USING REDUNDANT CONSTELLATION POINTS

(71) Applicant: HUAWEI TECHNOLOGIES CO., LTD., Guangdong (CN)

(72) Inventors: Nebojsa Stojanovic, Munich (DE); Liang Zhang, Munich (DE); Cristian Prodaniuc, Munich (DE); Jinlong Wei, Guangdong (CN); Changsong Xie, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/845,489

(22) Filed: Apr. 10, 2020

(65) Prior Publication Data
US 2020/0244370 A1 Jul. 30, 2020

Related U.S. Application Data

(63) Continuation of application No. PCT/EP2018/070314, filed on Jul. 26, 2018.

(51) Int. Cl.
*H04B 10/54* (2013.01)
*H04B 10/61* (2013.01)
*H04L 1/00* (2006.01)
*H04L 27/34* (2006.01)

(52) U.S. Cl.
CPC .......... *H04B 10/541* (2013.01); *H04B 10/61* (2013.01); *H04L 1/0047* (2013.01); *H04L 27/3477* (2013.01); *H04B 2210/07* (2013.01)

(58) Field of Classification Search
CPC ...... H04B 10/541; H04B 10/075–0779; H04L 27/345–3483
See application file for complete search history.

(56) References Cited

U.S. PATENT DOCUMENTS

| | | | |
|---|---|---|---|
| 6,026,120 A | | 2/2000 | Betts |
| 6,137,829 A | * | 10/2000 | Betts ................. H04L 25/03006 329/304 |
| 2017/0054533 A1 | * | 2/2017 | Sonkin ................. H04B 10/505 |
| 2017/0195059 A1 | * | 7/2017 | Rahn .................... H04B 10/516 |
| 2019/0013990 A1 | * | 1/2019 | Gerdes .................... H04L 27/38 |

FOREIGN PATENT DOCUMENTS

| | | |
|---|---|---|
| CN | 103944638 A | 7/2014 |
| CN | 105515650 A | 4/2016 |
| EP | 0553995 A1 | 8/1993 |
| WO | 2012039571 A2 | 3/2012 |

OTHER PUBLICATIONS

Chinese Office Action issued in Chinese Application No. 201880056172.7 dated Sep. 25, 2020 (eight pages).

\* cited by examiner

*Primary Examiner* — Casey L Kretzer

(57) ABSTRACT

An optical communication system that comprises a transmitter adapted to generate a signal by modulating a transmission data as low power consumption symbols of an amplitude modulation format and a monitoring data (MD) as high power consumption symbols of the amplitude modulation format, the MD comprising at least one transmitter parameter and/or at least one receiver parameter of communicating the transmission data. A binary logarithm of a total number of the low power consumption symbols and the high power consumption symbols is a non-integer.

20 Claims, 12 Drawing Sheets

AUXILIARY CHANNEL IN PAM/QAM SYSTEMS USING REDUNDANT CONSTELLATION POINTS

CROSS-REFERENCE TO RELATED APPLICATIONS

This application is a continuation of International Application No. PCT/EP2018/070314, filed on Jul. 26, 2018, the disclosure of which is hereby incorporated by reference in its entirety.

FIELD

Example embodiments relate to optical methods and systems for communication and more particularly to optical communication employing pulse or quadrature amplitude modulation coding. Some aspects relate to wireless communication and, more specifically but not exclusively, to methods and systems for wireless communication by an access point (AP).

BACKGROUND

Manufacturers of ultra-high-speed short reach optical fiber links aim to generate small, cheap, and low power consumption transceivers. These requirements are mainly imposed due to the limited space of data centers' equipment. These transceivers are designed to support intra- and inter-data centers connections from a few hundred meters up to several tens of kilometers, respectively.

Usually, in order to reduce costs, intensity modulation (IM) and direct detection (DD) schemes are used. A mature on-off keying modulation format, widely used in noncoherent systems, has been investigated for applications at 100 Gbit/s (100-G) per wavelength speed; however, such a solution would require expensive high-bandwidth optics and electronics. To overcome this drawback, advanced modulation formats supported by digital signal processing (DSP) have been investigated as an alternative technology to support 100-G. One of the most promising schemes for these applications is the four-level pulse amplitude modulation format (PAM) 4 (PAM-4) combined with intensity modulation and direct detection, however, the system performance can be significantly degraded by linear and nonlinear intersymbol interference. Also, when higher bit rate (e.g. 200 Gbit/s) is required, the system bandwidth limitation may force higher level modulation formats such as PAM6 or PAM8.

Bit rate and performance can be increased by using coherent systems, for instance in point-to-point data center connections.

A prior art PAM-n transmission system is presented in FIG. 1A. Data encoded by a forward error correction (FEC) block is partially equalized by a DSP at the transmitter side and converted into an analog signal by using a digital-to-analog converter (DAC). In order to decrease complexity, data is equalized in the analog domain by a continuous-time linear equalizer (CTLE). Subsequently, this signal is amplified using a modulator driver (MD).

A distributed feedback laser (DFB) together with an electro-absorption modulator (EAM) integrated in transmit optical subassemblies (TOSA) is often used in cheap systems in order to modulate the signal. Other cheap solutions include a direct-modulated laser (DML) or vertical-cavity surface-emitting laser (VCSEL). The optical signal after being modulated can be transmitted over different fiber types depending on requirements (distance, bit rate etc.). At the receiver side, a photo diode (PIN-positive-intrinsic negative or APD-avalanche photo diode) detects the optical signal. The output of the photo diode is proportional to the power of the optical signal. The photo diode output usually is amplified using a transimpedance amplifier (TIA). The photo diode and TIA can be integrated in receive optical subassemblies (ROSA) that may include an automatic gain control circuit (AGC) to adjust the electrical signal to an analog-to-digital (ADC) input when electronic equalization is used.

A prior art coherent QAM system is presented in FIG. 1B. When both polarizations are used together with complex modulation formats, the number of system components are increased by a factor of about 4. Such systems provide better performance and can carry more information than PAM IM/DD systems.

The receiver's equalizer recovers signals degraded from noise and inter symbol interference (ISI); however, before the equalizer is used, a synchronized local oscillator is locked to the input signal, for example to the transmitter oscillator responsible for data clocking. Small deviations are allowed since it is impossible to perfectly track the transmitter clock source. Clock extraction is supported by a timing recovery (TR) block that controls ADC sampling frequency and phase. The performance of this block is strongly influenced by noise that is partly filtered out by a specific filters. However, some imperfections such as bandwidth limitation and chromatic dispersion may result in a very weak timing function. Therefore, the signal used for timing recovery has to be partially compensated to enable correct ADC clocking. Feed-forward equalizers (FFEs) and decision feedback equalizers (DFEs) can be found in many practical systems while nonlinear equalizers (NLE) are less deployed although they can bring a significant gain in some special applications.

SUMMARY

According to a first embodiment, there is provided an optical communication system. The system comprises a transmitter adapted to generate a signal by modulating a transmission data as low power consumption carrier symbols of an amplitude modulation format and a monitoring data (MD) as high power consumption symbols of the amplitude modulation format, the MD comprising at least one transmitter parameter and/or at least one receiver parameter for communicating the transmission data.

According to a second embodiment, there is provided an optical communication system that comprises a receiver adapted to demodulate transmission data from low power consumption symbols of a signal modulated in an amplitude modulation format and demodulate monitoring data (MD) from high power consumption symbols of the amplitude modulation format, the MD comprising at least one transmitter parameter and/or at least one receiver parameter for communicating the transmission data.

According to a third embodiment, there is provided a method for optical communication modulation. The method comprises generating a signal by modulating a transmission data as low power consumption symbols of an amplitude modulation format and a monitoring data (MD) as high power consumption symbols of the amplitude modulation format, the MD comprising at least one transmitter parameter and/or at least one receiver parameter for communicating the transmission data.

According to a fourth embodiment, there is provided a method for optical communication demodulation. The method comprises receiving a signal, demodulating transmission data from low power consumption symbols of a signal modulated in an amplitude modulation format, and demodulating monitoring data (MD) from high power consumption symbols of the amplitude modulation format, the MD comprising at least one transmitter parameter and/or at least one receiver parameter for communicating the transmission data.

In any of the above embodiments, a binary logarithm of a total number of the symbols In any of the above embodiments, MD is modulated using high power consumption symbols of an amplitude modulation format, optimizing system performance based on MD without increasing system clock or changing a line baud rate, for example as described below. Systems and methods according to some embodiments allow optimizing system performance based on MD without changing bit and/or symbol framing and/or using forward error correction (FEC) on the MD. As further described below, performance of the systems and methods according to some embodiments are unaffected by the transmission of the MD. The amplitude modulation format is a multi-dimensional constellation format such as PAM or QAM as described herein.

Optionally, in any of the above embodiments, each of the high power consumption symbols represents a different binary sequence. This allows encoding various transmitter or receiver parameters.

Optionally, in any of the above embodiments, the high power consumption symbols are closer to at least one power level consumption periphery of the amplitude modulation format than the low power consumption symbols. This allows encoding various transmitter or receiver parameters in symbols which are not used for encoding transmission data.

Optionally, in any of the above embodiments, the amplitude modulation format is a multi-dimensional constellation format.

Optionally, in any of the above embodiments, the modulating comprises replicating each one of the low consumption symbols, optionally by a forward error correction (FEC) repetition coding. This redundancy allows the receiver to correct errors in the encoding or decoding.

Optionally, in any of the above embodiments, the MD encodes a system transfer function described by a plurality of Fast Fourier Transforms (FFTs), a plurality of feed forward equalization (FFE) coefficients, eye skew information, one or more bit error rate (BER) parameters, one or more receiver analog parameters, and/or receiver Digital Signal Processing (DSP) related parameters.

Optionally, in any of the embodiments herein, the amplitude modulation format is selected from a group consisting of: pulse amplitude modulation (PAM) and quadrature In the above embodiments, transmitters are adapted to modulate MD using high power consumption symbols of an amplitude modulation format, optimizing system performance based on MD without increasing system clock or changing a line baud rate, for example as described below. The above embodiments allow optimizing system performance based on MD without changing bit and/or symbol framing and/or using forward error correction (FEC) on the MD. As further described below, performance of the systems and methods according to some embodiments are unaffected by the transmission of the MD. The amplitude modulation format is a multi-dimensional constellation format such as PAM or QAM as described herein.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments, exemplary methods and/or materials are described below. In case of conflict, the patent specification, including any express definitions, will control. In addition, the materials, methods, and examples are illustrative only and are not intended to be necessarily limiting.

BRIEF DESCRIPTION OF THE SEVERAL VIEWS OF THE DRAWINGS

Some embodiments are herein described, by way of example only, with reference to the accompanying drawings. With specific reference now to the drawings in detail, the particulars shown are by way of example and for purposes of illustrative discussion of embodiments. In this regard, the description taken with the drawings makes apparent to those skilled in the art how embodiments may be practiced.

In the drawings.

DETAILED DESCRIPTION OF EXAMPLE NON-LIMITING EMBODIMENTS

The technology herein, in some embodiments thereof, relates to wireless communication and, more specifically, but not exclusively, to methods and systems for wireless communication by an access point (AP).

Figure 1A:
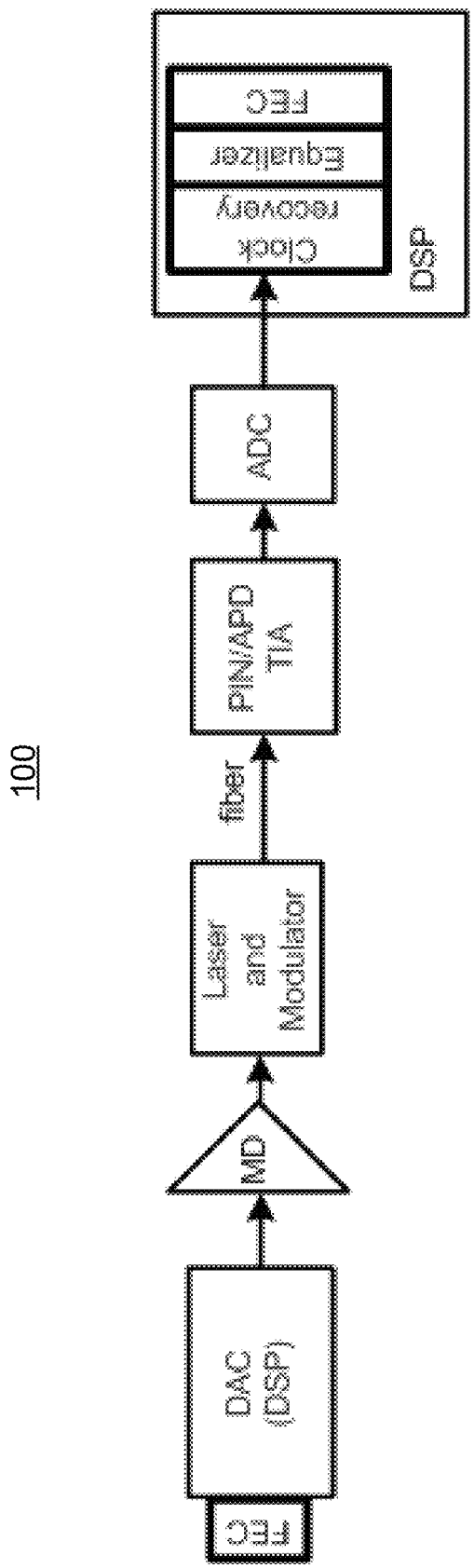
FIG. 1A is a prior art PAM-n transmission system.
Figure 1B:
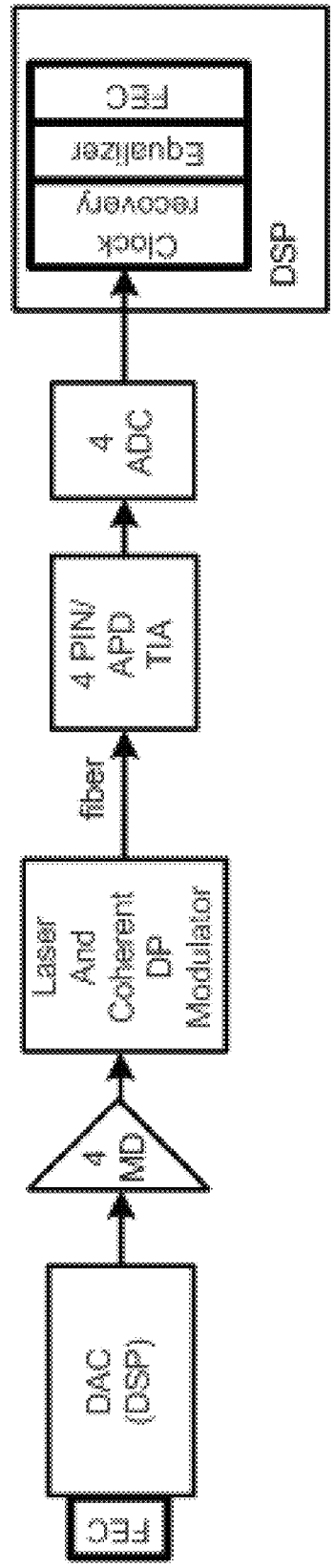
FIG. 1B is a prior art coherent QAM transmission system.
Figure 2:
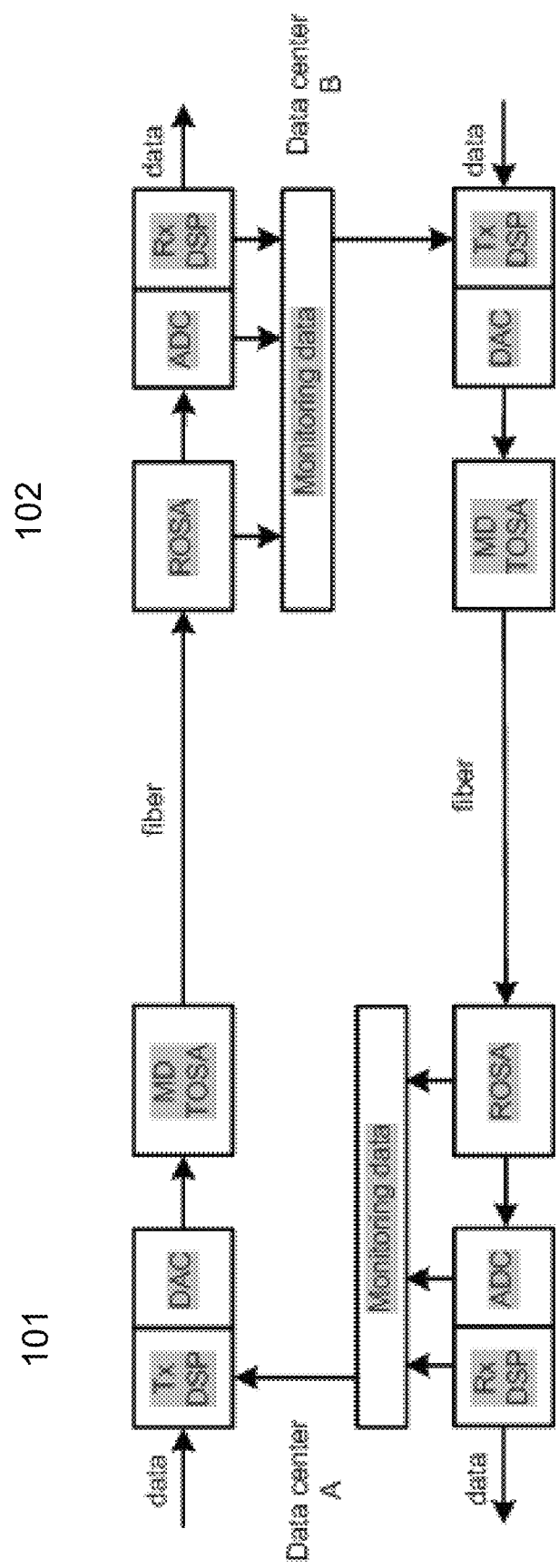
FIG. 2 is a schematic illustration of two data centers connected via two transceivers and connected by multiple links.
Figure 3:
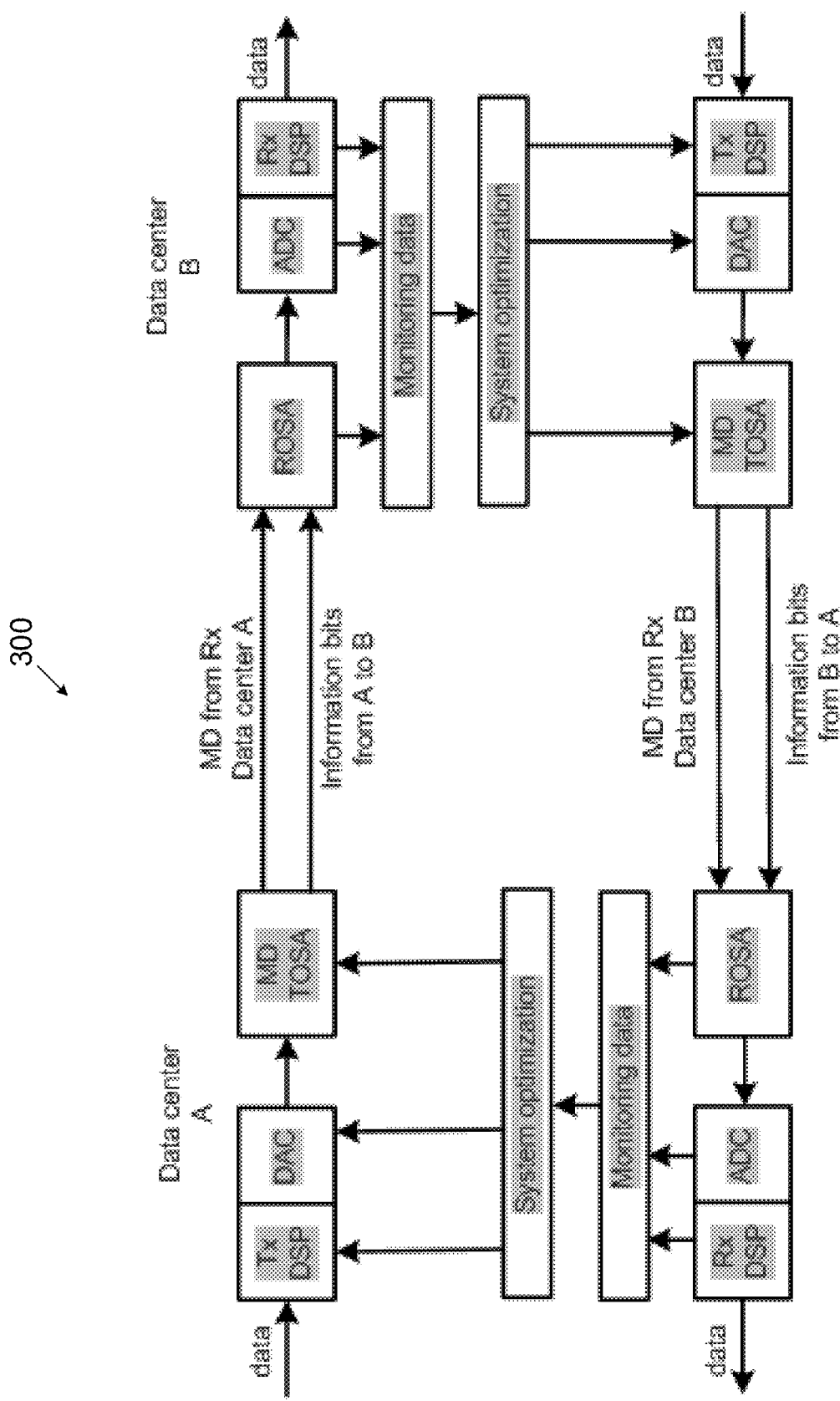
FIG. 3 is a schematic illustration of two data centers connected via two transceivers and connected by multiple links with MD optimization.

Big data centers which are located in a large campus may be situated remotely from one another, for example at a distance of several hundred meters up to 2 kilometers (km) or even more from one another. In FIG. 2, two data centers, denoted as A and B, are connected via two respective transceivers and connected by multiple links. The data centers exchange digital information. Each of the data centers has a transceiver 101, 102. However, these transceivers 101, 102 could reside in a common data center. In order to improve performance, transceivers 101, 102 are equipped with DSPs at the transmitting and receiving sides, denoted herein as Tx (transmit) and Rx (receive). The best performance may be achieved with the optimum Tx/Rx DSP configuration. To configure Tx/Rx, additional DSP information is exchanged between Tx and Rx. For example, Tx DSP information is used to reshape a transmitted signal to achieve optimum performance after an Rx equalization process. In such an implementation, the Rx has no information about the performance of the received signal. The Rx DSP may extract and prepare information about a quality of the received signal and this information, referred to herein as monitoring data, may be sent to the transmitter to allow the Tx DSP to preprocess the data optimally before transmission. To send monitoring data, an auxiliary channel may be used. The monitoring data, also referred to herein as MD, contains information about transmitter and receiver conditions. Additionally, MD may carry information about DSP parameters, BER, clock jitter, signal amplitude variations and or the like. As shown at FIG. 3, MD may be processed by enhanced tools in order to optimize system performance. For example, a receiver FFE may use N coefficients to compensate for intersymbol interference (ISI). Better performance may be achieved when ISI is partially compensated at the transmitter side. Based on FFE coefficients, software modules may calculate optimum Tx FFE and Rx FFE taps. Also, MD may indicate malfunctions of the Tx side, for instance bias variations (e.g. laser, modulator, driver and/or the like) or other instabilities.

Figure 4B:
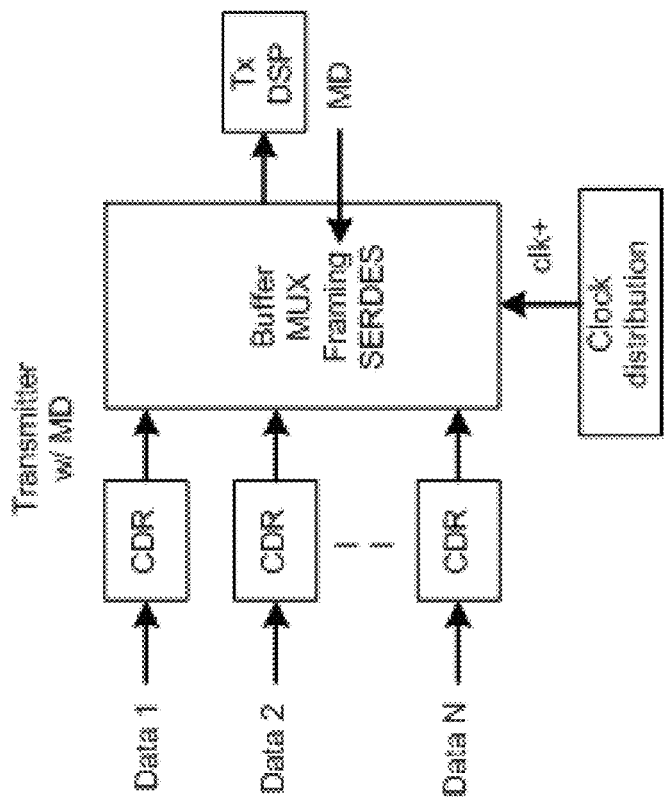
FIGS. 4A and 4B are schematic illustrations of two data centers without MD and where MD bits are inserted in an information bit sequence.
Figure 4A:
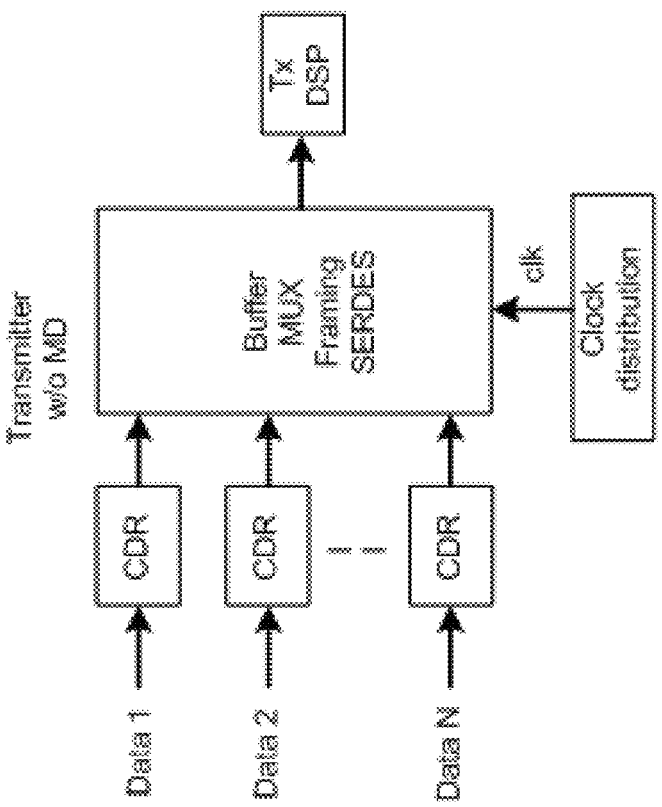

The MD may be multiplexed with the symbols encoding transmission data. Such multiplexing generally requires specific framing which uses more power and increases baud rate. Also, DSP clock is usually increased by the redundancy added by symbols representing MD. For example, in the example depicted in FIG. 4B (right figure), MD bits are inserted in information bit sequence. At the exemplified transmitter, N parallel data streams are received using N clock and data recovery blocks (CDRs). These data streams are buffered, multiplexed using well defined framing structure, and prepared for a Tx DSP in block manner (e.g. M parallel data streams). The MD bits may be inserted after a multiplexing phase. This generally requires higher system clock frequency (e.g. clk+instead clk; clk+>clk), new framing structure, and new frame synchronization. This may be in conflict with some well standardized framing structures (Ethernet/OTN). This causes problems related to the compatibility.

A different known solution requires inserting the MD by an additional amplitude modulation. Such insertion may decrease system performance, especially in high-order modulation systems such as PAM-6 or QAM-32. In these systems, instead of using the fixed symbol level L, the symbol level may be L−Δ or L+Δ to transmit 0 or 1 MD bits, respectively. This appears as additional noise because the minimum level distance will be degraded by 2Δ. Smaller Δ results in better BER but the MD channel may be very prone to errors. On the other hand, the receiver needs an enhanced MD bit detector that is not easy to realize by using small Δ.

Before explaining at least one embodiment in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The technology herein may be a system, a method, and/or a computer program product. The computer program product may include a computer readable storage medium (or media) having computer readable program instructions thereon for causing a processor to carry out aspects of the technology herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the technology herein.

Aspects of the technology herein are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions stored in non-transitory memory.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
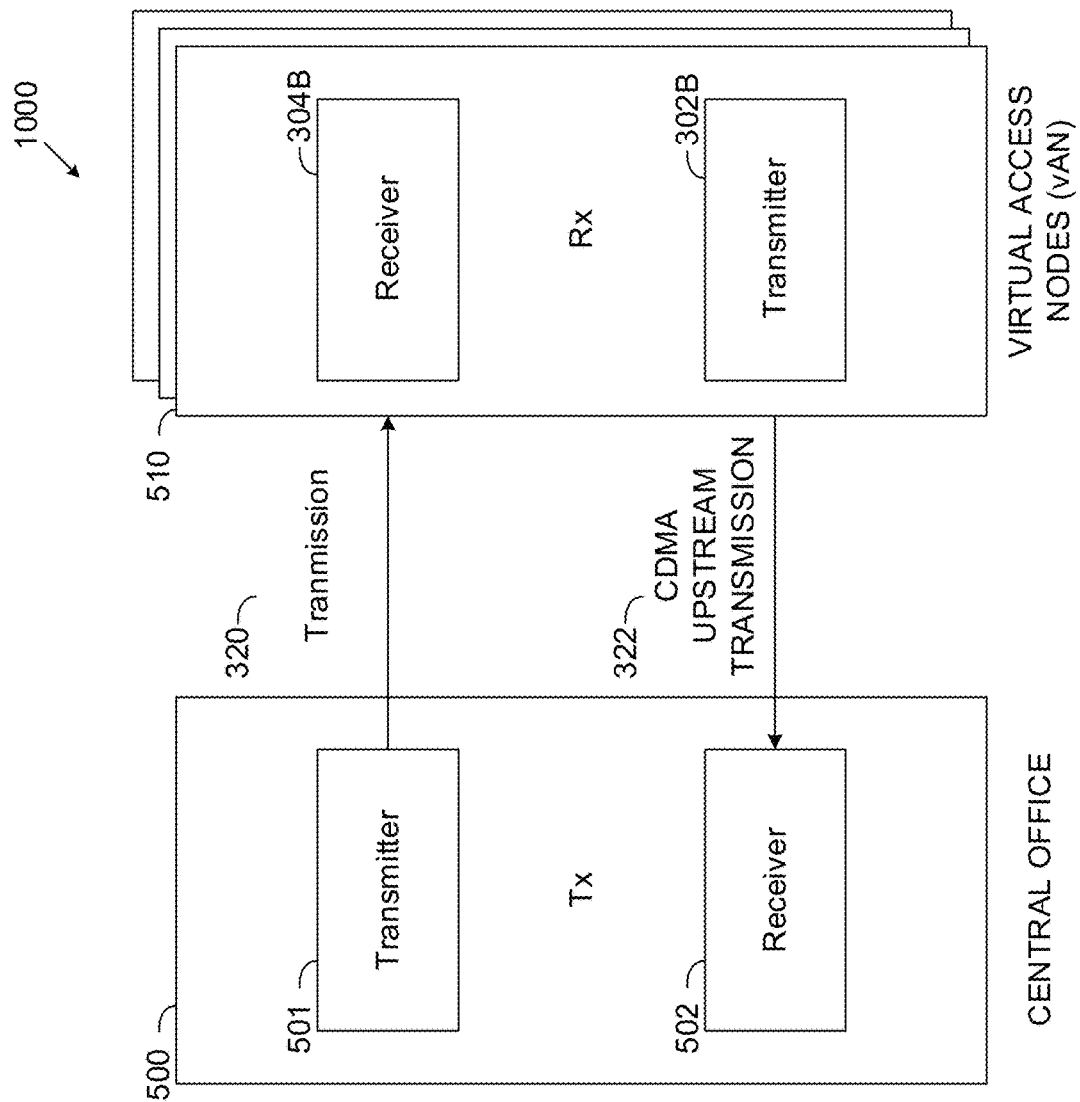
FIG. 5 is a schematic illustration of optical communication systems where each of the systems has a transmitter and a receiver, according to some embodiments.

Reference is now made to FIG. 5 which is a schematic illustration of optical communication systems 500, 510, such as the above described above Tx, Rx where each of the systems has a transmitter 501, 511 and a receiver 502, 512, according to some embodiments. The receivers 502, 512 are adapted to receive signals modulated and transmitted by the transmitters 501, 511.

In these systems, the transmitters 501, 511 are adapted to modulate MD using high power consumption symbols of an amplitude modulation format, optimizing system performance based on MD without increasing system clock or changing a line baud rate, for example as described below. Systems and methods according to some embodiments allow optimizing system performance based on MD without changing bit and/or symbol framing and/or using forward error correction (FEC) on the MD. As further described below, performance of the systems and methods according to some embodiments are unaffected by the transmission of the MD. The amplitude modulation format is a multi-dimensional constellation format such as PAM or QAM as described herein.

Optionally, the MD encodes information (e.g. bits) about system behavior. For example one or more of the following may be used to encode information about system behavior:
  a system transfer function described by a plurality of Fast Fourier Transforms FFT,
  a plurality of feed forward (FFE) coefficients, and eye skew information,
  one or more bit error rate (BER) parameters,
  one or more receiver analog parameters, and
  receiver Digital Signal Processing (DSP) related parameters.

In one example, when the amplitude modulation format is a PAM-6 format, the transmitter 501 may send a signal encoding transmission data without any precompensation. The receiver 502, 512 receives the signal and extracts therefrom clock and clock recovery works. This may be used by receiver 502, 512 performing equalization with suboptimum performance. In such an embodiment, the receiver 502, 512 may collect one or more of the following data:
  1. A system transfer function described by N FFT points (i.e. only N/2 points are necessary as the system is noncoherent; only the real signal is processed).
  2. M FFE coefficients.
  3. Six items of eye skew information.

Figure 6A:
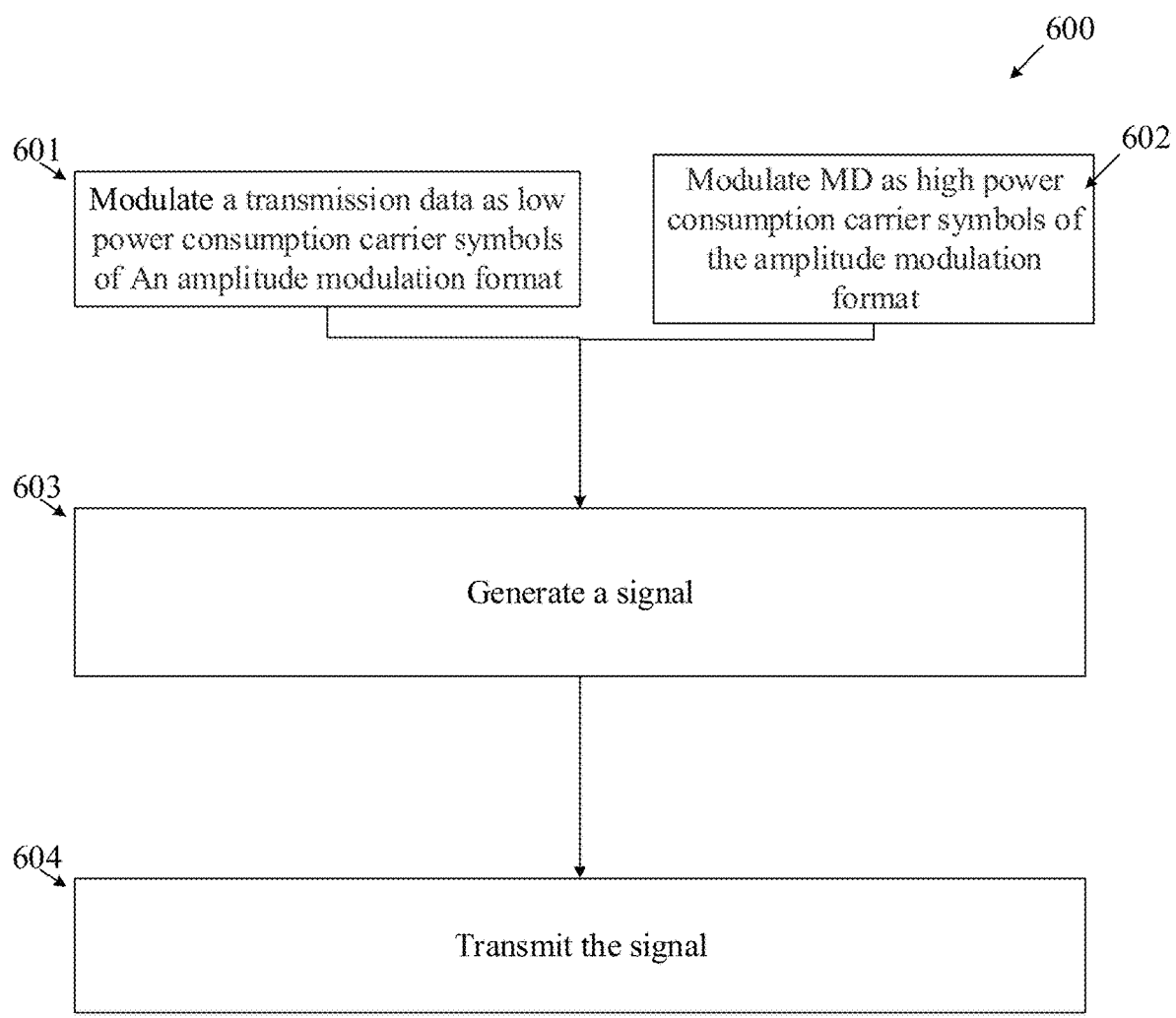
FIG. 6A is a flowchart of a method for modulating MD using high power consumption symbols of an amplitude modulation format, optimizing system performance based on MD, according to some embodiments.

Reference is also made to FIG. 6A which is a flowchart 600 of a method for encoding MD in high power symbols of an amplitude modulation format in a signal encoded by the amplitude modulation format, for instance by a transmitter of the system 500 depicted in FIG. 5, according to some embodiments.

As shown at 601, transmission data is modulated, optionally by the transmitter 501, 511, as low power consumption symbols of the amplitude modulation format.

As shown at 602, MD is modulated, optionally by the transmitter 501, 511, as high power consumption symbols of the amplitude modulation format. The MD includes one or more transmitter parameters and/or receiver parameters related to communicating the transmission data between the transmitter 501 and the receiver 511.

As shown at 603, the modulation allows generating a modulated signal, referred to herein as transmission signal and transmitting it to a receiver, optionally 502, 512, where the MD includes transmitter parameter(s) and/or receiver parameter(s) related to the transmission data communication. As shown at 604, the signal is then transmitted.

Figure 6B:
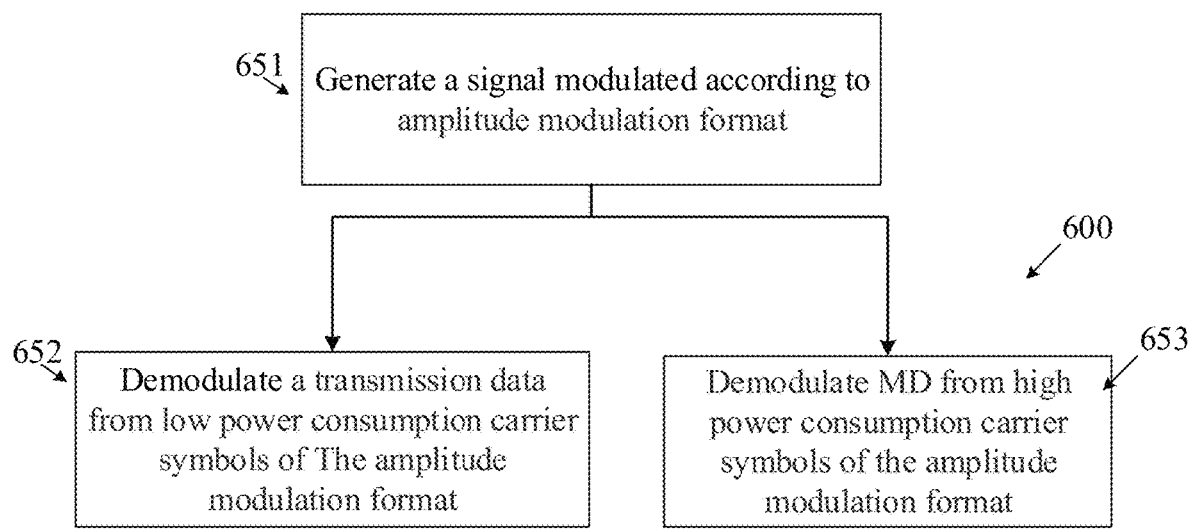
FIG. 6B is a flowchart of a method for demodulating MD which are modulated using high power consumption symbols of an amplitude modulation format, optimizing system performance based on MD, according to some embodiments.

Reference is also made to FIG. 6B which is a flowchart 650 of a method for decoding MD encoded in high power symbols of a amplitude modulation format from a signal encoding also transmission data, for instance a method implemented by the receiver 502, 512 of the system 500 depicted in FIG. 5, according to some embodiments.

As shown at 651, a signal encoded in the amplitude modulation format, for instance as depicted in FIG. 6A, is received using the receiver 502, 512.

Then, as shown at 652, transmission data is demodulated from low power consumption symbols of the signal and, as shown at 653, MD is demodulated from high power consumption symbols of the amplitude modulation format where the MD includes transmitter parameter(s) and/or receiver parameter(s) related to the transmission data communication. Optionally, a binary logarithm of a total number of the symbols is a non-integer.

Figure 11:
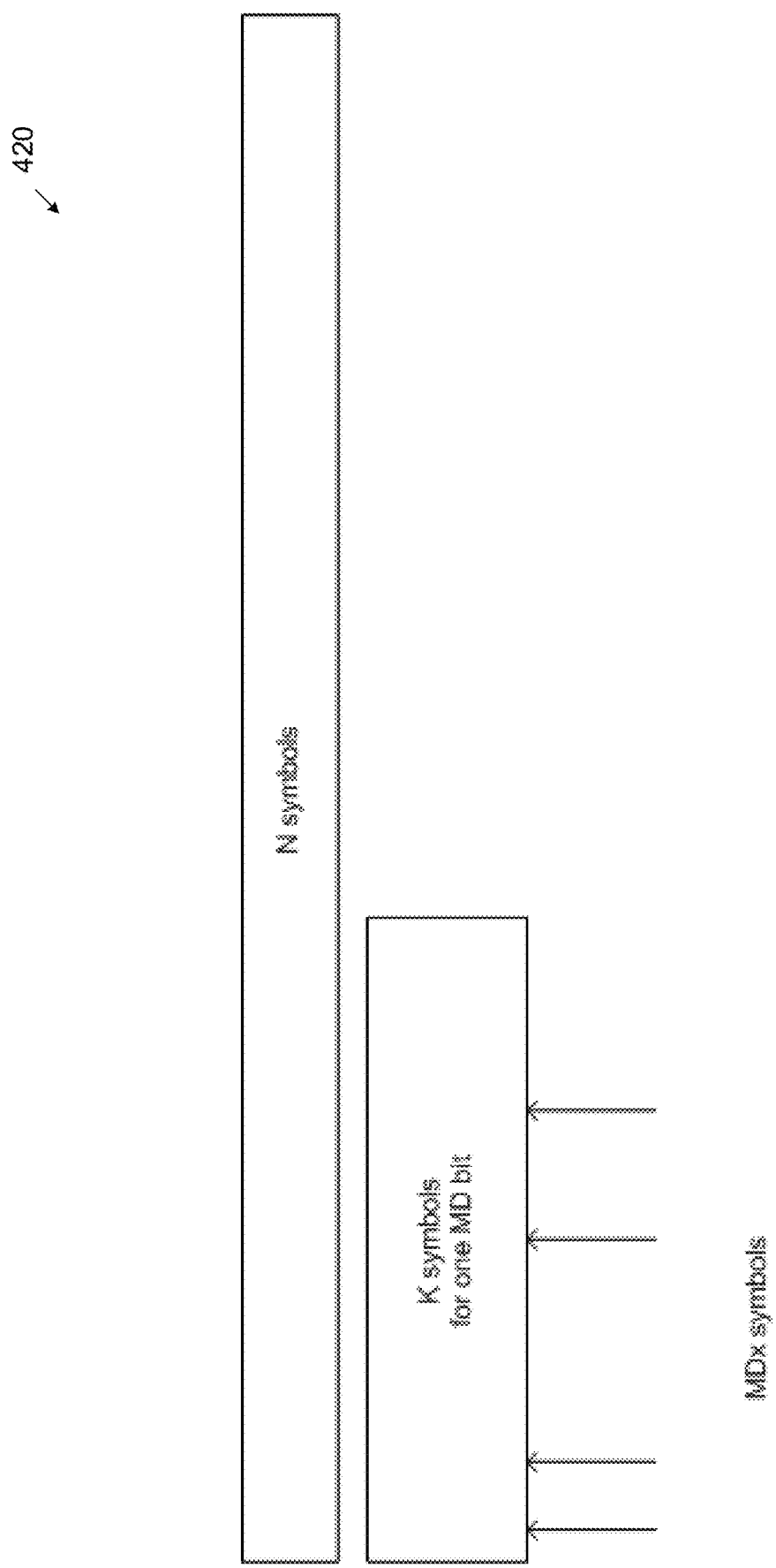
FIG. 11 is a schematic illustration of K high frequency symbols for one MD bit out of N symbols of amplitude modulation format, according to some embodiments.

Optionally, a binary logarithm of a total number of the low power consumption symbols and the high power consumption symbols of the amplitude modulation format is a non-integer. For instance, when N symbols are used, Kk is a non-integer that equals log 2(n). In other words, the used amplitude modulation format is a constellation with redundancy. For example, the used amplitude modulation format is a two-dimensional (2D) PAM6 or constellations having more dimensions, for instance 8D PAM6. In 8D PAM6, 6^8=1679616 different combinations are possible; however, log 2(6^8)=20.6797 bits can be encoded, hence only 20 bits. The number of redundant combinations is 6^8-2^20=631040 that can be used for MD. FIG. 11 depicts how 1 MD bit is encoded. In FIG. 11, one MD bit is sent with a period of N symbols. In one embodiment, only in the first K symbols is this MD bit encoded. On average, the MD bit is encoded/inserted K/16 times (e.g. as replicas). 0 or 1 MD constellation points occur with probability of 1/16.

Figure 8:
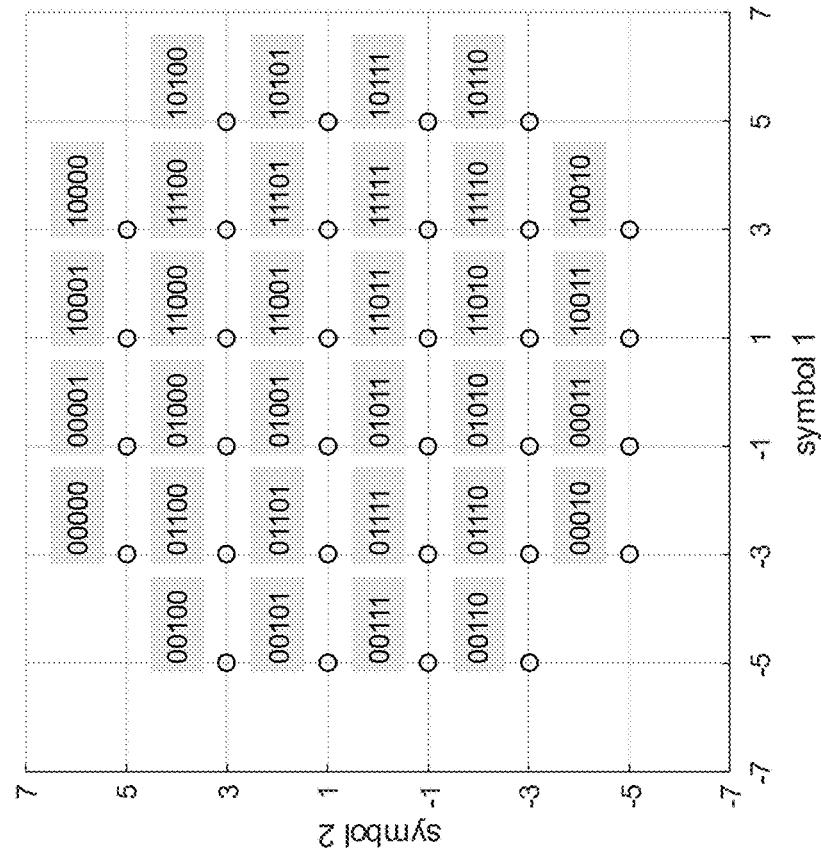
FIG. 8 is a schematic illustration of PAM-6 mapping with binary information.
Figure 7:
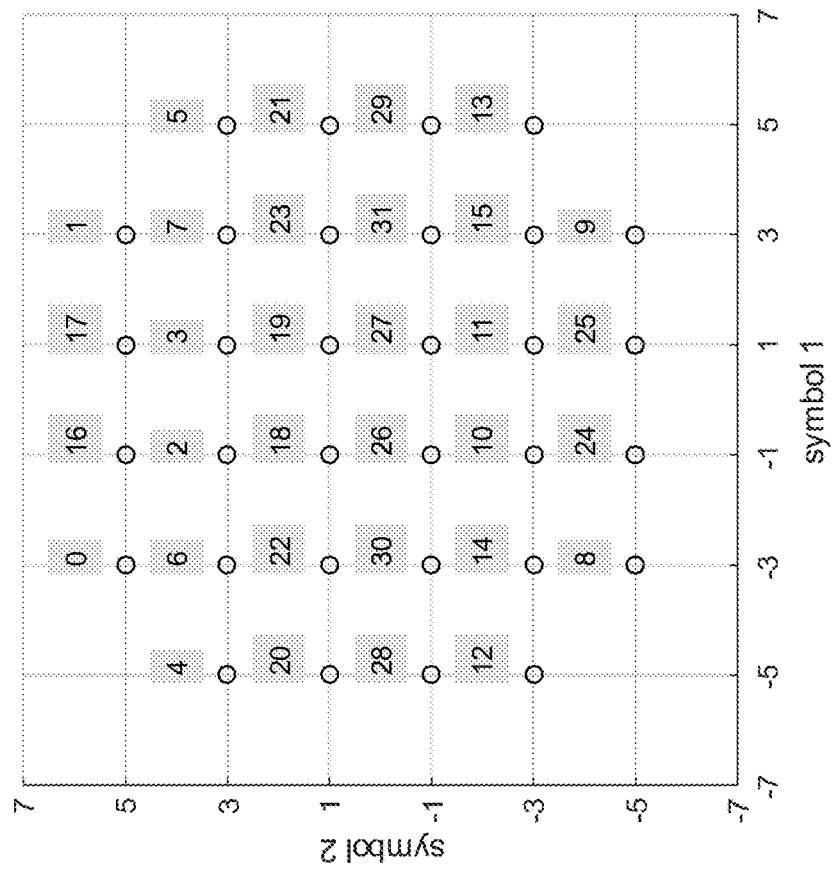
FIG. 7 is a schematic illustration of PAM-6 mapping.

For example, amplitude modulation formats with such number of low power consumption symbols include PAM-n and QAM-$n^2$ (n>2) modulation formats. For example, a PAM-6 format uses 6-level signals in order to encode 5 information bits via two consecutive symbols. PAM-6 levels are denoted herein by −5, −3, −1, 1, 3, and 5 so that two symbols may represent a two-dimensional constellation as shown in FIG. 7. The symbol numbers are also shown (e.g. natural binary representation). The bit assignment to each symbol is shown in FIG. 8 so that each of the high power consumption symbols represents a different binary sequence.

In this example, there is no full Gray mapping and a semi-Gray mapping is used with a Gray mapping penalty of 1.1667. In this example, four outer points in a PAM-6 constellation are used not for encoding transmission data but instead for encoding MD. This can be implemented in coherent detection where positive and negative signals can be distinguished. In noncoherent cases, a constellation as depicted in FIG. 10 can be used.

Optionally, the high power consumption symbols are closer to power level consumption periphery of the amplitude modulation format than the low power consumption symbols. For example, in FIG. 9 these four points are the edge points marked as 901-904. The MD is optionally encoded (e.g. represented by bits) and sent via these outer points (in this example four points). For example, symbol pairs (−5, 5) and (5, −5) may be used to transmit MD 0 bit while pairs (−5, −5) and (5, 5) may be used to transmit MD 1 bit (see FIG. 9). These symbols are also shown in FIG. 10 and denoted by M00, M01, M10, and M11. For example, when no auxiliary bit is sent, the symbol 4 is mapped by (−5, 3). When auxiliary bit 0 is sent, the symbol 4 uses mapping (−5, 5) (the M00 symbol is sent). The information bit flow is unaffected. When M00 is detected as symbol 0 (00000), one bit error occurs (00100). Error multiplication is 1.

Figure 10:
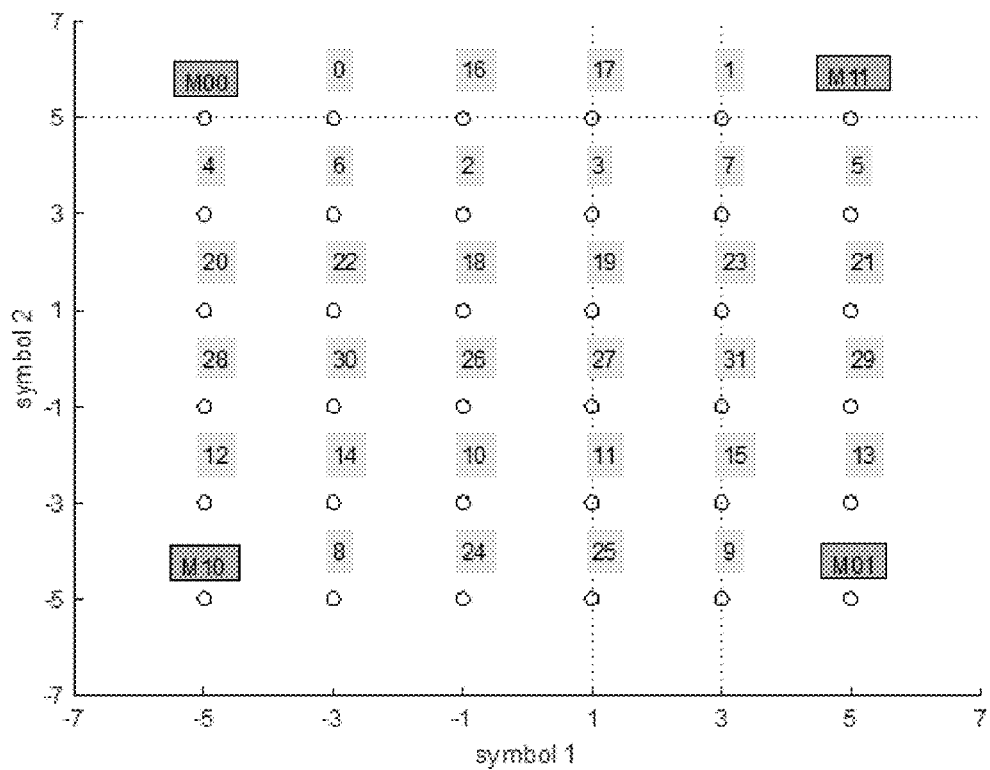
FIG. 10 is a schematic illustration of PAM-6 mapping with high frequency symbols which modulate binary information representing MD, according to some embodiments.

Optionally, the high power consumption symbols are concentrated in one edge of the amplitude modulation format, for example as depicted in FIG. 10. In this example, 4 high power consumption symbols (e.g. in PAM6 case) are depicted as filled blocks while the low power consumption symbols are depicted as empty blocks. The mapping may be adjusted to facilitate the constellation and transfer various MD bits. It should be noted that the constellation depicted in FIG. 10 is adapted to detection of a bipolar signal that requires a relatively expensive receiver (e.g. a modified coherent or coherent receiver).

Figure 9:
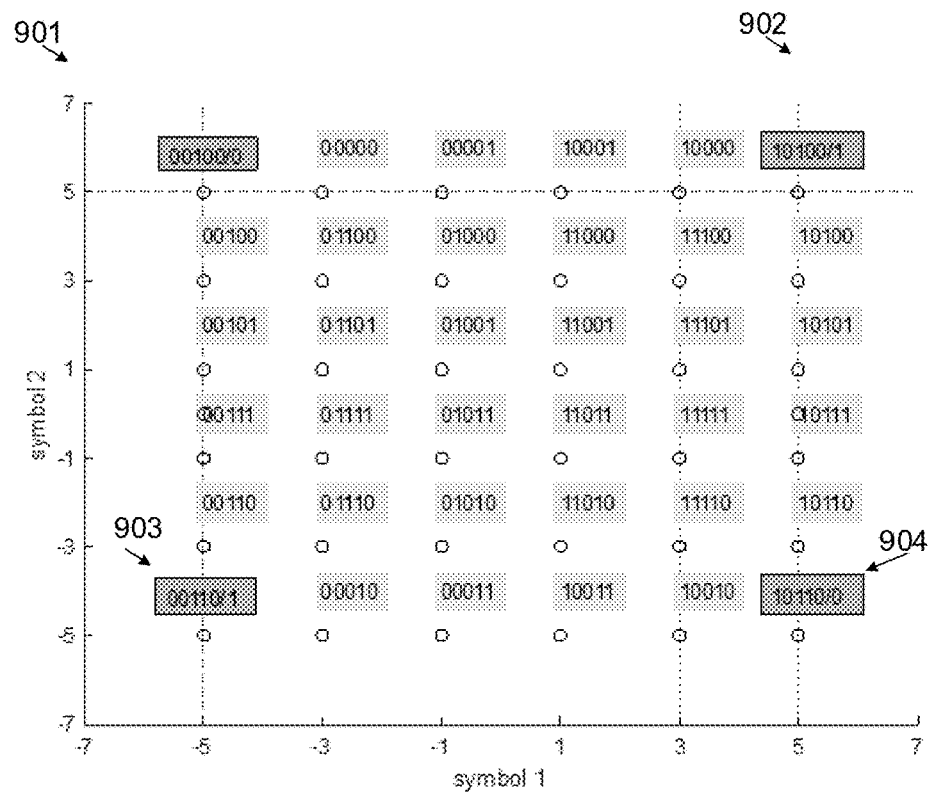
FIG. 9 is a schematic illustration of PAM-6 mapping with high frequency symbols which modulate MD, according to some embodiments.

The error multiplication rate and performance degradation increase when edge symbols are used frequently, e.g. four points 4, 5, 12, and 13 in FIG. 9. For example, in a 64 Gbaud PAM-6 system, when all symbols have a similar occurrence probability after scrambling, the probability of each symbol is ⅓₂. As any of two symbols (e.g. ⁴⁄₁₃ or ⁵⁄₁₂) represents one MD bit, an averaged frequency of an information bit is 32/8=4 GHz. This may occur in a link between the Tx and the Rx, for example of two data centers. Such a link is quasi-static and experiences small variations over time. In an auxiliary channel, bit rate is normally less than 1 Mbit/s. For example, in a 10 kbit/s MD channel, one auxiliary bit is transmitted within a period of N=3.2e6 data symbols. To send an MDx (x=0, 1) bit, a range of K symbols is used. The average number of MDx symbols in K symbols is K/16 (two symbols may be used for MD bit encoding). When in this period M, MD bit copies are sent (e.g. the MD bit is repeated M times, the number M being selected so that a probability of incorrect MD bit decision is quite low and no additional FEC is required). For example, when M=20, parameter K may be 320. In average, in 320 symbols, 20 MD symbols are used. The MD bits are inserted in the beginning of each information symbol block (N symbols). The receiver detects MD symbols. When an MD bit 0 is sent, a probability that MD0 and MD1 symbols are in error and that MD bit is set to be 1 is extremely low for practical pre-FEC BER values. As the ratio N/M is quite large, SNR performance and error multiplication will not be influenced by the auxiliary channel.

In use, after channel acquisition (e.g. clock and data recovery), MD is prepared for transmission for further system optimization. For instance, when the amplitude modulation format is 64 Gbaud PAM-6 format, a 2D symbol baud rate of 32 Gbaud are used. When such a format is used, the MD channel bit rate may be set to 10 kb/s. Two symbols 4 and 13 are used for MD bit 0 encoding while symbols 5 and 11 are used for MD bit 1 encoding. The MD bit is inserted in M~K/16 symbols (replicated to avoid errors; as an FEC repetition code). The receiver counts the number of MD0 and MD1 symbols that can also have errors. The decision may be based on the rule:

$$MD = \begin{Bmatrix} 0 & \text{if} & n0 > n1 \\ 1 & \text{if} & n0 \le n1 \end{Bmatrix},$$

where n0 and n1 denote a number of MD0 and MD1 symbols respectively, detected within K 2D symbols: The mean number of MD0 symbols is K/16 and this number may vary around a mean value; however, the MD bit probability may be made very low by increasing K.

Figure 12:
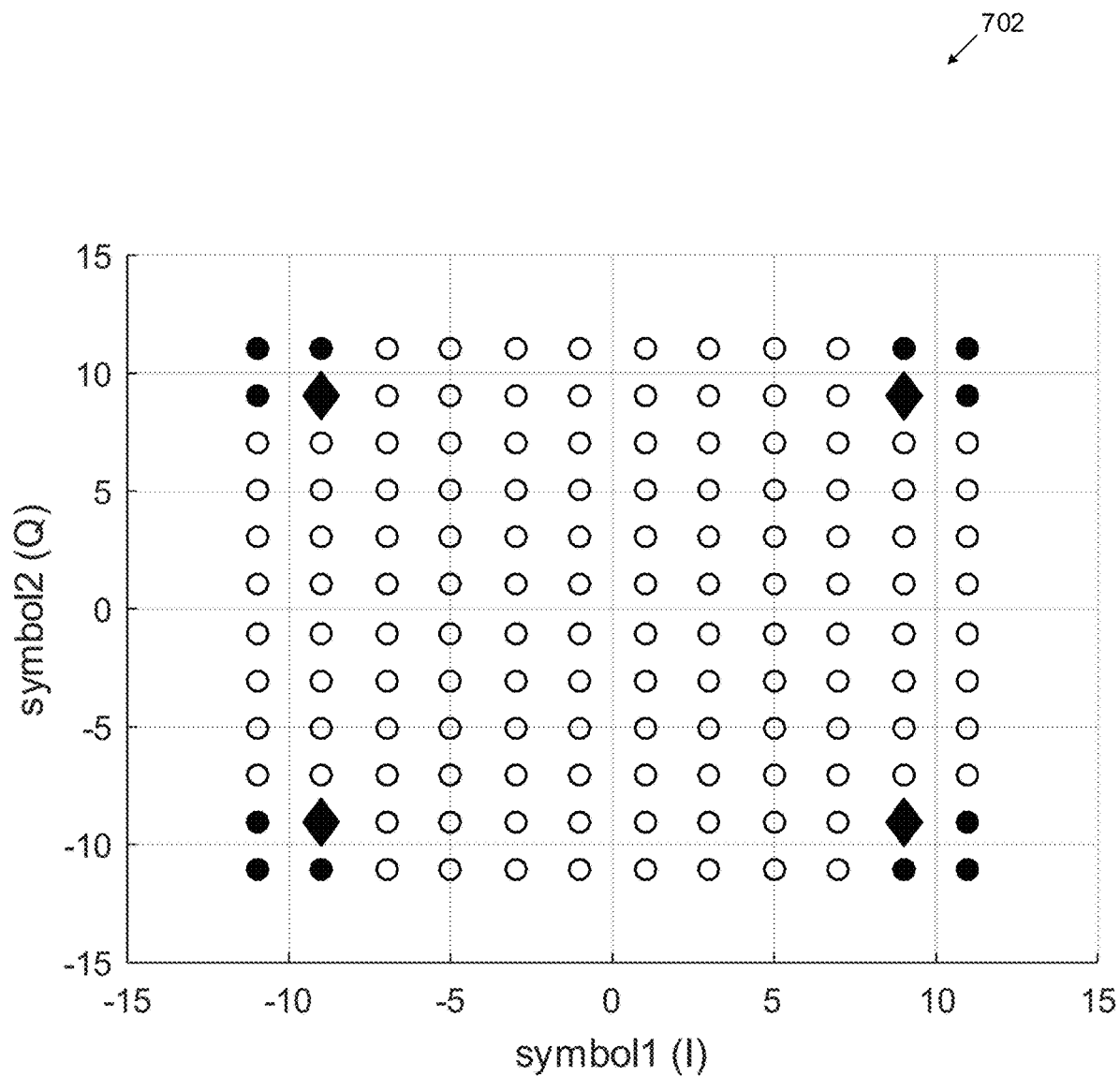
FIG. 12 is a schematic illustration of PAM-12 mapping with high frequency symbols which modulate MD, according to some embodiments.

In another example, depicted in FIG. 12, a used amplitude modulation format is a PAM-12 constellation where two consecutive symbols are used to carry 7 bits or a QAM-128 complex constellation having I and Q bits. In such an example, symbols indicated in FIG. 12 as solid points are not used for encoding data transmission. Such symbols may be used to transmit MD. In the simplest variant, the diamond symbols can carry MD bits (e.g. M00, M01, M10, and M11 as depicted in FIG. 9).

Figure 13:
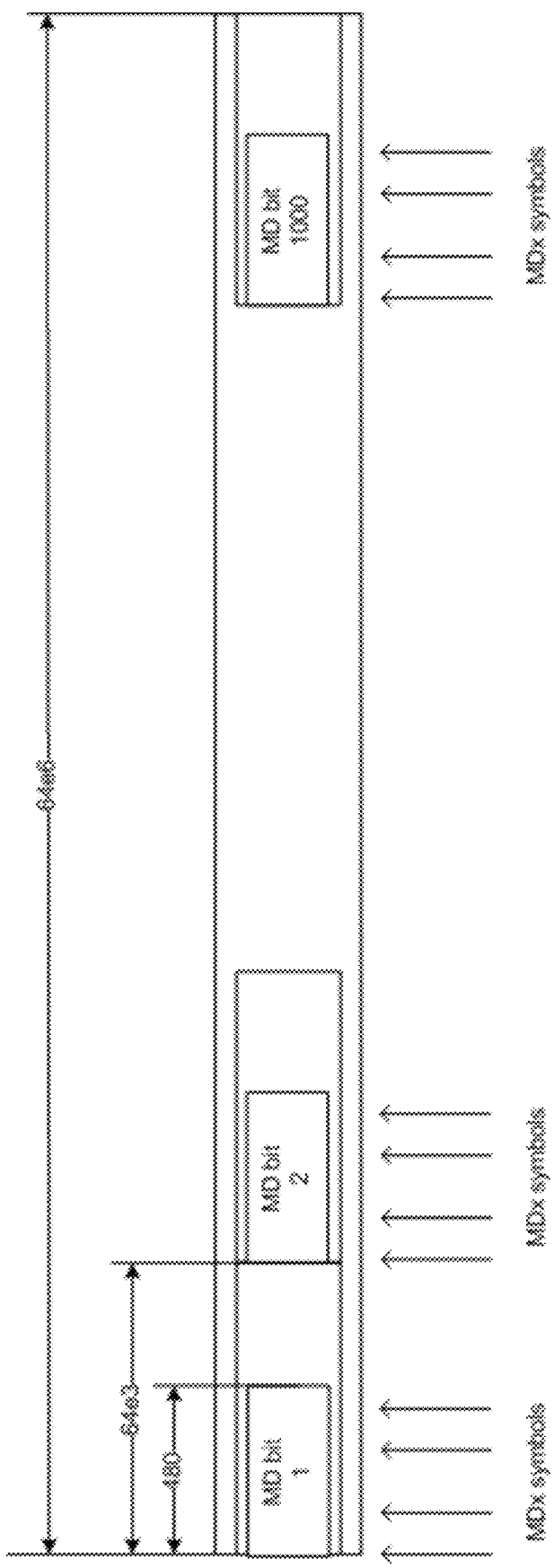
FIG. 13 is a schematic illustration of replication of high power consumption symbols (also referred to in the figures as MDx symbols) of an amplitude modulation format, according to some embodiments.

Let us suppose that 1000 MD bits are sent per MD period which is a frequency of MD data. When the system does not experience fast channel changes that is the case in short DC interconnections, the MD period can be 1 millisecond. This corresponds to 64 million symbols in 64 GB PAM-6 systems. It means that 64000 symbol durations will be used for sending one MD bit as depicted in FIG. 13.

For short DC interconnections where the MD period is 1 millisecond, fast channel changes are not experienced. This corresponds to 64 million symbols in 64 GB PAM-6 systems. It means that 64000 symbol durations will be used for sending one MD bit. This corresponds to a 100 kb/s MD channel.

According to some embodiments, as exemplified above, a pattern of high power symbols representing MD is repeated, for instance 2, 10, 50 times or any intermediate of a larger number of repetitions. The replicating of each low consumption symbol may be performed by FEC repetition coding.

This is used to reduce the probability of MD bit error, preferably making it negligible. For instance, 30 repetitions of MD symbols are used to encode 1 MD bit. Then, one MD bit encoding interval is 30×16 symbols which is 480 symbols (see FIG. 13). So, the first 480 symbols are used in the group of 64000 symbols to encode a single MD bit. In such embodiments, bit error rate (BER) is influenced only by this interval. This effects only 480/64000=0.75% of the data so the BER degradation has no effect on the integrity of the data.

Other systems, methods, features, and advantages of the present disclosure will be or become apparent to one with skill in the art upon examination of the drawings and detailed description. It is intended that all such additional systems, methods, features, and advantages be included within this description, be within the scope of the present disclosure, and be encompassed by the accompanying claims.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application, many relevant systems and methods will be developed and the scope of the term "a processor", "a receiver" and "a transmitter" is intended to include all such new technologies a priori. As used herein, a receiver and a transmitter may be part of a transceiver.

As used herein, the term "about" refers to ±10%.

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features, which are, for clarity, described in the context of separate embodiments, may also be provided in combination in a single embodiment. Conversely, various features, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art. To the extent that section headings are used, they should not be construed as necessarily limiting.

What is claimed is:

1. An optical communication system, comprising:
a transmitter adapted to amplitude-modulate a signal using a square amplitude modulation constellation format including transmission data as low power consumption symbols of the square amplitude modulation constellation format and monitoring data (MD) as high power consumption symbols of the square amplitude modulation constellation format, wherein the low power consumption symbols represent a lower transmit power level consumption than a transmit power consumption level represented by the high power consumption symbols, the MD comprising at least one transmitter parameter and/or at least one receiver parameter for communicating the transmission data;
wherein a binary logarithm of a total number of the low power consumption symbols and the high power consumption symbols is a non-integer,
wherein the square amplitude modulation constellation format comprises a constellation format with no data symbols defined at or near the corners thereof, and the high power consumption symbols complete the square.

2. The optical communication system of claim 1, wherein each of the high power consumption symbols represents a different binary sequence.

3. The optical communication system of claim 1, wherein the high power consumption symbols are closer to at least one power level consumption periphery of the square amplitude modulation constellation format than the low power consumption symbols.

4. The optical communication system of claim 1, wherein the square amplitude modulation constellation format is a multi-dimensional square constellation format comprising:
N low power consumption symbols where N is a power of 2; and
plural additional high power consumption symbols at or near corners of the square constellation format.

5. The optical communication system of claim 1, wherein the modulating comprises replicating each one of the low consumption symbols by a forward error correction (FEC) repetition coding.

6. The optical communication system of claim 1, wherein the MD encodes a member of a group consisting of:
a system transfer function described by a plurality of Fast Fourier Transforms (FFTs),
a plurality of feed forward (FFE) coefficients, and eye skew information,
one or more bit error rate (BER) parameters,
one or more receiver analog parameters, and
receiver Digital Signal Processing (DSP) related parameters.

7. The optical communication system of claim 1, wherein the amplitude modulation is selected from a group consisting of: pulse amplitude modulation (PAM) and quadrature amplitude modulation (QAM).

8. The method of claim 1 wherein the square amplitude modulation constellation format comprises a QAM-32 constellation format or a QAM-128 constellation format.

9. An optical communication system, comprising:
a receiver adapted to demodulate transmission data from low power consumption symbols of a signal amplitude-modulated in a square amplitude modulation constellation format and demodulate monitoring data (MD) from high power consumption symbols of the square amplitude modulation constellation format, wherein the low power consumption symbols represent a lower transmit power level consumption than a transmit power consumption level represented by the high power consumption symbols, the MD comprising at least one transmitter parameter and/or at least one receiver parameter for communicating the transmission data;
wherein a binary logarithm of a total number of the low power consumption symbols and high power consumption symbols is a non-integer,
wherein the square amplitude modulation constellation format comprises a constellation format with no data symbols defined at or near the corners thereof, and the high power consumption symbols complete the square.

10. The optical communication system of claim 9, wherein each of the high power consumption symbols represents a different binary sequence.

11. The optical communication system of claim 9, wherein the high power consumption symbols are closer to at least one power level consumption periphery of the square amplitude modulation constellation format than the low power consumption symbols.

12. The optical communication system of claim 9, wherein the square amplitude modulation constellation format is a multi-dimensional square constellation format comprising:
N low power consumption symbols where N is a power of 2; and
plural additional high power consumption symbols at or near corners of the square constellation format.

13. The optical communication system of claim 9, wherein each one of the low consumption symbols is replicated by a forward error correction (FEC) repetition coding.

14. A method for optical communication demodulation, comprising:
receiving a signal amplitude-modulated in a square amplitude modulation constellation format including low power consumption symbols and high power consumption symbols, wherein the low power consumption symbols represent a lower transmit power level consumption than a transmit power consumption level represented by the high power consumption symbols;
demodulating transmission data from the low power consumption symbols of the square amplitude modulation constellation format; and
demodulating monitoring data (MD) from the high power consumption symbols of the square amplitude modulation constellation format, the MD comprising at least one transmitter parameter and/or at least one receiver parameter for communicating transmission data;
wherein a binary logarithm of a total number of the low power consumption symbols and the high power consumption symbols is a non-integer,
wherein the square amplitude modulation constellation format comprises a constellation format with no data symbols defined at or near the corners thereof, and the high power consumption symbols complete the square.

15. The method of claim 14, wherein each of the high power consumption symbols represents a different binary sequence.

16. The method of claim 14, wherein the high power consumption symbols are closer to at least one power level consumption periphery of the square amplitude modulation constellation format than the low power consumption symbols.

17. The method of claim 14, wherein the square amplitude modulation constellation format is a multi-dimensional constellation format comprising:
N low power consumption symbols where N is a power of 2; and
plural additional high power consumption symbols at or near corners of the square constellation format.

18. The method of claim 14, wherein each one of the low consumption symbols is replicated by a forward error correction (FEC) repetition coding.

19. The method of claim 14 wherein the symbols comprise carrier symbols.

20. The method of claim 14 wherein the low power consumption symbols cause a photo diode to produce a low power optical signal output and the high power consumption symbols cause a photo diode to produce a high power optical signal output.

* * * * *